Jan. 25, 1938. H. NILSON 2,106,620
PRESSURE PUMP
Filed Oct. 26, 1936
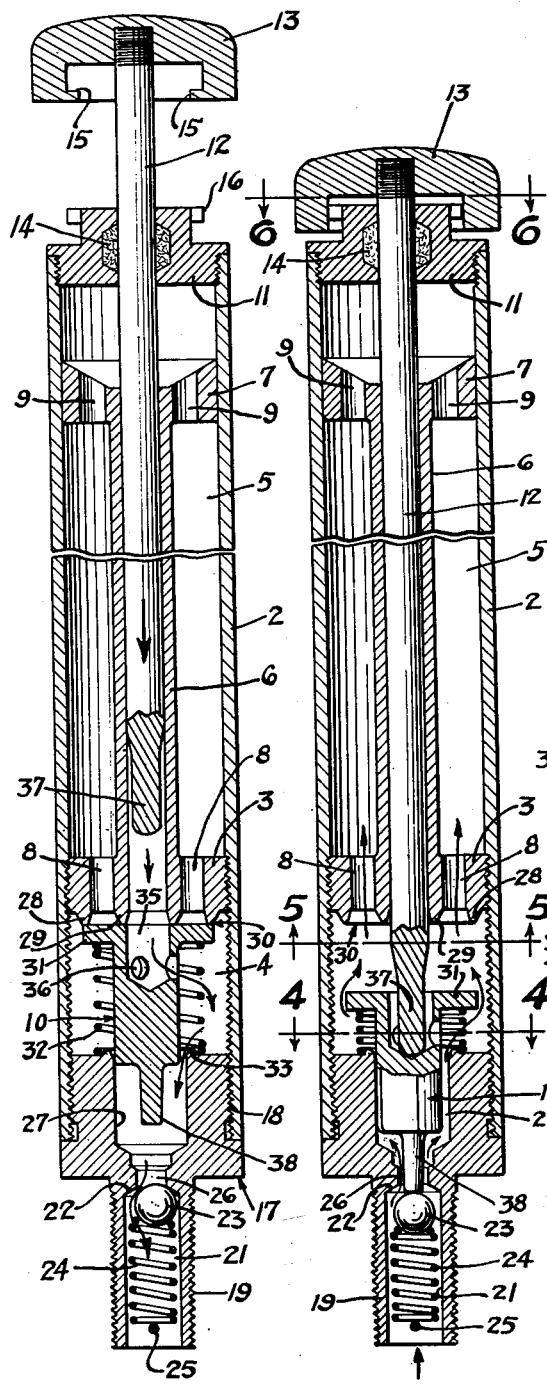
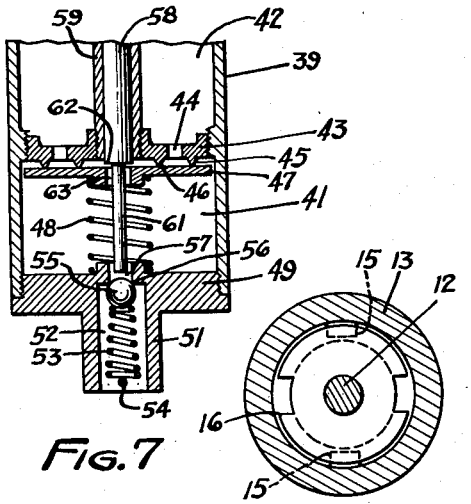
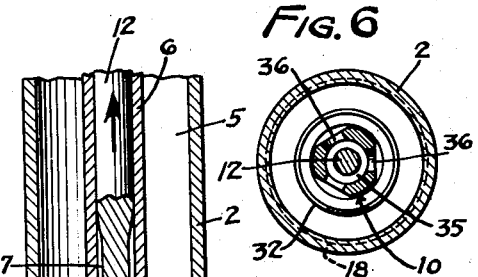
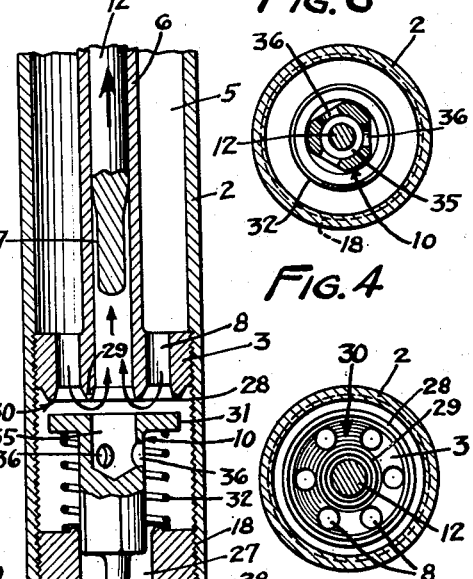
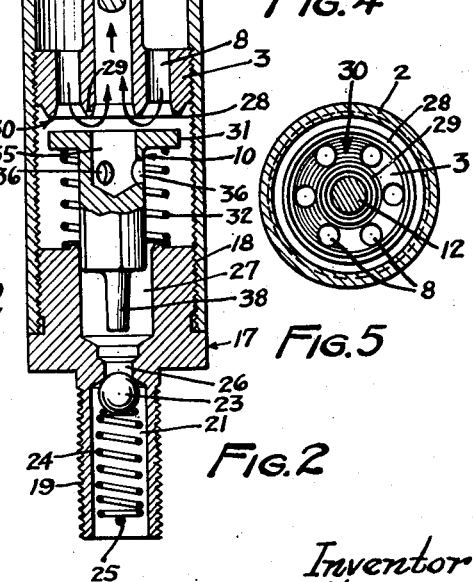
Inventor
HAROLD NILSON
By Paul, Paul & Moore
ATTORNEYS Patented Jan. 25, 1938

2,106,620

UNITED STATES PATENT OFFICE 2,106,620

PRESSURE PUMP

Harold Nilson, Wayzata, Minn., assignor of one-third to John A. Edeby, Wayzata, Minn., and one-third to Emil Berglund, Minneapolis, Minn.

Application October 26, 1936, Serial No. 107,621

6 Claims. (Cl. 103—41)

This invention relates to new and useful improvements in pressure pumps and more particularly to such an apparatus of the hydraulic type.

An object of the present invention is to provide a simple and inexpensive pressure pump comprising few parts, and all of which are so assembled and arranged as to provide a very compact unit.

A further object is to provide a pressure pump comprising a plurality of valves which are so arranged that by manipulation of the pump piston, the valves may be tapped and manually unseated, thereby to dislodge foreign matter which may have accumulated upon the valve seats.

A further object is to provide a pressure valve comprising a casing having a valve chamber and a reservoir therein, and the valve chamber having an outlet adapted to be connected to a device to be operated, said outlet having a normally closed check valve, and a disk valve being mounted on the valve chamber and normally interrupting circulation between said chamber and the reservoir, and a cylinder and piston controlling the circulation of the fluid between the chamber and reservoir, said piston being so associated with the valves that when moved to a predetermined position, said valves are unseated to allow the fluid to return from the device to the reservoir.

A further object is to provide an improved apparatus of the class described, which readily lends itself for various uses as, for example, automobile jacks, hydraulic rams, presses, and various other mechanisms, and whereby such devices may be operated with a minimum of effort.

Other objects of the invention reside in the unique construction and arrangement of the various parts thereof, whereby the pump may be operated at any angle without affecting the operation thereof; in the particular arrangement of the valves thereof with respect to the piston whereby, when the piston is moved in one direction, the valves are forcibly unseated to permit the return of the fluid to the reservoir; and, in the novel arrangement of the disk valve for closing the fluid circulating pasages between the fluid chamber and the reservoir, which is such that its movement is in opposed relation to the movement of the piston, and whereby the fluid may readily be circulated through the apparatus with a minimum of effort upon the operating member.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a longitudinal sectional view of my improved pump showing the valves thereof, as positioned during the pressure stroke;

Figure 2 is a view similar to Figure 1, showing the valves in the positions assumed during the suction stroke;

Figure 3 is a view showing the piston positioned to open the valves and allow the fluid to return to the reservoir;

Figure 4 is a cross-sectional view on the line 4—4 of Figure 3;

Figure 5 is a cross-sectional view on the line 5—5 of Figure 3, showing the fluid circulating passages in the partition between the valve chamber and the reservoir;

Figure 6 is a cross-sectional view on the line 6—6 of Figure 3, showing a means for locking the piston in valve-opening position; and Figure 7 is a view showing a modified construction wherein the piston is arranged to directly engage each valve to unseat the same.

The novel pressure pump herein disclosed is shown comprising a casing 2, preferably cylindrical in cross-section, as shown in Figures 4 and 5, and having a suitable partition 3 therein adjacent one end thereof, whereby a valve chamber 4 is provided at one end of the casing, and a reservoir 5 at its other end. The reservoir may be of any suitable size, depending upon the nature of the work the pump is to be used for.

As best shown in Figures 1 and 3, a suitable cylinder 6, of relatively small diameter, is shown having one end secured to the partition 3 and its opposite end to a suitable guide 7, which fits the bore of the casing 2, thereby to retain the cylinder 6 in axial alinement with the casing 2. A plurality of fluid circulating passages 8 are provided in the partition 3 and similar fluid circulating passages 9 may be provided in the guide 7. The upper end of the casing 2 is shown closed by a suitable head 11, received in threaded engagement with the wall of the casing, whereby a leak-proof connection is provided between the casing 2 and head 11. In the drawing, I have shown the guide 7 spaced from the head 11, but it is to be understood that the guide may be arranged in close proximity to the head or, if desired, the guide may be dispensed with and the upper end of the cylinder supported directly in the head 11.

A suitable piston 12 is mounted for reciprocal movement in the cylinder 6, and is provided at its upper end with a head or hand grip 14, whereby the piston may be conveniently operated. The upper portion of the piston is guidingly supported in the head 11, and a suitable packing, generally indicated by the numeral 14, is provided in the head for preventing leakage of the fluid around the piston 12. The head or hand grip 13 is shown provided with inwardly projecting lugs 15 adapted to interlock with a notched flange 16 in the head 11, as illustrated in Figure 3, thereby to lock the piston in the position shown in this figure. The flange 16 is provided with suitable notches for receiving the lugs 15.

An important feature of this invention resides in the novel construction of the valve mechanism for controlling the circulation of the fluid from the reservoir 5 to the device to be operated, not shown. As shown in Figures 1, 2, and 3, a suitable plug, generally indicated by the numeral 17, is suitably secured to the lower end of the casing 2 by such means as threads 18, to provide a closure therefor. This plug is shown provided with a threaded extension 19 having a bore 21 therein terminating at one end in a valve seat 22, normally closed by a suitable check valve 23. A spring 24 normally holds the check valve 23 on the seat 22, as best shown in Figure 2. Suitable means, such as a pin 25, is provided for supporting the opposite end of the spring, and whereby the spring constantly urges the check valve 2 into engagement with its seat 22. A passage 26 connects the bore 21 of the extension 19 with a bore 27 provided at the upper or opposite end of the plug 17. The bore 27 is in constant communication with the valve chamber 4.

The partition 3 is shown provided at its lower side, when viewed as shown in Figures 1, 2, and 3, with a plurality of annular ribs 28 and 29, which cooperate to provide a dual valve seat 30 for a valve member, generally indicated by the numeral 10. The valve member 30 has a disk 31 at its upper end normally held against the valve seat 30 by a suitable spring 32, one end of which engages the disk 31 and the opposite end, the adjacent end of the plug 17. A suitable ridge 33 may be provided on the plug 17 to retain the spring 32 in axial alinement with the bore 27.

The body portion of the disk valve 10 is preferably of triangular cross-section, as best shown in Figure 4, to provide fluid-circulating passages between it and the wall of the bore 27. The lower end of the body of the disk valve 10 is loosely received in the bore 27 which serves as a guide therefor. The upper end of the valve 10 is provided with a suitable recess or counterbore 35, the upper end of which is in direct communication with the cylinder 6, and its lower end with the valve chamber 4 by a series of ducts 36. Thus, it will be seen that the check valve 23 and disk valve 10 are disposed in axial alinement with respect to the casing 2 and cylinder 6.

Another important feature of the invention resides in the novel means provided for unseating the two valves 10 and 22 to allow the fluid to return from the device to the reservoir 5, as indicated by the arrows in Figure 3. The means provided for thus unseating the valves is clearly illustrated in Figures 1, 2, and 3, and resides in so constructing the piston that when it is moved downwardly from the position shown in Figure 1, to that shown in Figure 3, the lower terminal 37 thereof will engage the disk valve 10 and move it downwardly against the tension of the spring 32, to the position shown in Figure 3. The disk valve 10 may be retained in this position by the lugs 15 and flange 16, as shown in Figure 3.

To open the check valve 23, the disk valve 10 is shown provided with a depending terminal 38 which may be projected through the discharge opening or outlet 26, into engagement with the check valve 23, whereby the latter is unseated, when the disk valve 10 is moved to the position shown in Figure 3. When the valves are so positioned, the fluid may circulate upwardly through the bore 21 of the extension 19, through the discharge opening 26, valve chamber 4, and passages 9 into the reservoir 5. When the cap or grip 13 of the piston is detached from the head 11 of the casing, as shown in Figure 1, the valves will return to their normal positions in engagement with their respective seats.

Another important feature of the invention resides in the unique arrangement of the valves 10 and 23 with respect to the piston, whereby should one or both of the valves be rendered leaky, because of foreign matter accumulating upon their respective seats, such foreign matter may readily be dislodged from the valve seats by tapping the upper end of the piston 12, when the lower end thereof is engaged with the disk valve 10. By thus tapping the upper end of the piston, the valve 10 may be unseated in rapid succession to jar loose and dislodge any foreign matter which may have accumulated upon its seat 30. Should the check valve 23 become leaky, as a result of foreign matter accumulating on its seat 22, the piston is pushed downwardly to substantially the position shown in Figure 3, whereby it will be noted that the disk valve 10 has been forced downwardly in the valve chamber to a position where its lower terminal 38 engages the check valve 23. When the piston is thus positioned, and the upper end thereof is tapped with the hand in rapid succession, a vibratory movement is imparted to the valve 23, whereby any foreign matter which may have accumulated upon its seat will be jarred loose, as will readily be understood.

By referring to Figures 1, 2, and 3, it will be noted that the valves are so arranged with respect to one another and to the piston, that the disk valve 10 may readily be manipulated to unseat foreign matter from its seat without disturbing the check valve 23. When the piston is moved from the position shown in Figure 3, to that shown in Figure 1, the valves are released and returned to their normal closed positions, and the piston may then be operated in the usual manner to pump fluid from the reservoir 5, through the valve chamber 4, and outlet 26 to the device to be operated. The piston is made relatively small in diameter, whereby it may be operated with very little effort, even though the apparatus is used for lifting a very heavy load.

By arranging the valves and piston, as herein disclosed, a very simple and inexpensive apparatus is provided, which may be manufactured at small cost, and which readily lends itself to manufacture in quantity production. The piston provides the sole means for operating the pump, that is, by reciprocating the piston, the fluid is circulated from the reservoir through the outlet 26 and extension 19 to the device to be operated, and when it is desired to release the pressure in the operated device, the piston is simply moved downwardly to the position shown in Figure 3, whereby the valves are opened to allow free return of the fluid to the reservoir 5. The novel pump herein disclosed, may be operated at any particular angle, which is a desirable feature in that it readily lends itself for use in connection with various types of mechanisms requiring the application of high pressures with a minimum of effort.

In Figure 7, I have shown an apparatus comprising a casing 39 having a valve chamber 41 at its lower end, and a reservoir 42 at its upper end separated by a suitable partition 43. The partition 43 is provided with suitable fluid circulating passages 44, and has a plurality of annular ridges 45 and 46 on its lower face cooperating to provide a dual valve seat 40, normally engaged by a suitable disk valve 47. The disk valve 47 is held against the valve seat 40 by a suitable spring 48, having its lower end seated upon a plug or head 49 providing a closure for the lower end of the casing 39.

The head 49 is shown provided with an extension 51 having a bore 52 for receiving a suitable spring 53, the lower end of which is shown seated against a pin 54. The upper end of the spring 53 is seated against a check valve 55 which is engaged with a seat 56 provided at the lower end of a discharge opening 57.

The structure shown in Figure 7 differs from that shown in the previous figures in that the piston 58, which is slidably supported in a cylinder 59, is shown provided with a reduced terminal 61 which traverses an opening 63 in the disk valve 47, and is adapted to engage the check valve 55 and unseat it, when the piston is moved downwardly in the manner shown and described with reference to Figure 3. The piston 58 has an annular shoulder 62 which engages the disk 47 to unseat the latter when the piston is moved downwardly. The extension 61 of the piston is relatively smaller in diameter than the opening 63 in the disk valve 47, whereby the disk valve is floatingly supported in the valve chamber 41. The operation of the structure illustrated in Figure 7 is substantially the same as that shown in the previous figures.

I claim as my invention:

1. In an apparatus of the class described, a casing having a reservoir and a valve chamber provided with an outlet adapted to be connected to a device to be operated, a valve normally closing the outlet, a disk valve floatingly supported in the valve chamber and normally closing a fluid passage between the valve chamber and the reservoir, a cylinder having a piston operable therein for forcing the fluid from the reservoir through the valve chamber and outlet to the device, and said valves being so related to one another and to the piston, that when the latter is moved to a predetermined position in one direction, said valves are opened to allow the fluid to return to the reservoir from the device.

2. In an apparatus of the class described, a casing having a suitable outlet at one end adapted to be connected to a device to be operated, a normally closed check valve in said outlet, said casing also having a reservoir and a valve chamber, a fluid passage for establishing communication between the valve chamber and the reservoir, a disk valve normally closing said passage, a cylinder and piston for pumping the fluid from the reservoir and through said valves to the device, said disk valve and piston being arranged in substantially axial alinement, whereby when the piston is moved to a predetermined position in one direction, said disk valve will open, and continued movement of the piston in the same direction will subsequently open the check valve and thereby allow the pressure fluid to return from the device to the reservoir.

3. In an apparatus of the class described, a casing having a partition therein dividing it into a reservoir, and a valve chamber, said partition having a suitable fluid passage therein for establishing communication between the reservoir and the valve chamber, said valve chamber having an outlet adapted to be connected to a device to be operated, a normally closed check valve in said outlet, a disk valve floatingly supported in the valve chamber and normally closing said fluid passage, a cylinder in the reservoir, a piston operable in the cylinder for pumping fluid from the reservoir through the valve chamber and outlet to the device, means whereby when the piston is moved to a predetermined position in one direction, it will engage and unseat the disk valve, and means on the disk valve adapted to engage and unseat the check valve by continued movement of the piston in the same direction, whereby both of said valves may be opened by manipulation of the piston, thereby to allow the pressure fluid in the device to return to the reservoir.

4. In an apparatus of the class described, a casing having a partition therein dividing it into a reservoir and a valve chamber, said partition having a suitable fluid passage therein for establishing communication between the reservoir and the valve chamber, said valve chamber having an outlet adapted to be connected to a device to be operated, a normally closed check valve in said outlet, a disk valve floatingly supported in the valve chamber and normally closing said fluid passage, a cylinder in the reservoir, a piston operable in the cylinder for pumping fluid from the reservoir through the valve chamber and outlet to the device, said valves being substantially axially alined with the piston, whereby when the piston is moved to a predetermined position, it will directly engage and unseat the disk valve, and the disk valve having a terminal normally spaced from the check valve, but adapted, upon continued movement of the piston, to engage and unseat the check valve, and means for locking the piston in valve opening position to allow the fluid in the device to return to the reservoir through said valves.

5. In an apparatus of the class described, a casing having a reservoir and a valve chamber, said valve chamber having an outlet provided with a check valve for controlling fluid flow therethrough, a disk valve in the valve chamber normally positioned to interrupt fluid circulation between the reservoir and the valve chamber, a cylinder within the reservoir, a piston mounted for reciprocal movement in the cylinder and adapted to pump fluid from the reservoir through said valve chamber and outlet to a device to be operated, and means whereby the piston may be moved into engagement with the disk valve to unseat it, and whereby said disk valve may be moved out of engagement with its seat in rapid succession, by tapping the opposite end of the piston, thereby to dislodge foreign matter which may have accumulated upon the seat of the disk valve.

6. In an apparatus of the class described, a casing having a reservoir and a valve chamber, said valve chamber having an outlet provided with a check valve for controlling fluid flow therethrough, a disk valve in the valve chamber normally positioned to interrupt fluid circulation between the reservoir and the valve chamber, a cylinder within the reservoir, a piston mounted for reciprocal movement in the cylinder and adapted to pump fluid from the reservoir through said valve chamber and outlet to a device to be operated, means whereby the piston may be moved into engagement with the disk valve to unseat it, and whereby said disk valve may be moved out of engagement with its seat in rapid succession, by tapping the opposite end of the piston, thereby to dislodge foreign matter which may have accumulated upon the seat of the disk valve, and means made operable by continued movement of the piston in one direction to also effect the unseating of the check valve, thereby to allow the fluid to return to the reservoir from the device.

HAROLD NILSON.